US 8,681,794 B2

(12) United States Patent
Hill et al.

(10) Patent No.: US 8,681,794 B2
(45) Date of Patent: Mar. 25, 2014

(54) SYSTEM AND METHOD FOR EFFICIENT MATCHING OF REGULAR EXPRESSION PATTERNS ACROSS MULTIPLE PACKETS

(75) Inventors: Nate Hill, Milpitas, CA (US); Stanislas Wolski, Santa Clara, CA (US); Joseph Tardo, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 160 days.

(21) Appl. No.: 13/330,642

(22) Filed: Dec. 19, 2011

(65) Prior Publication Data

US 2013/0136127 A1    May 30, 2013

Related U.S. Application Data

(60) Provisional application No. 61/565,423, filed on Nov. 30, 2011.

(51) Int. Cl.
*H04L 12/28* (2006.01)

(52) U.S. Cl.
USPC .......................................................... 370/392

(58) Field of Classification Search
USPC ............ 370/289, 389, 392, 395.71, 412–413, 370/428–429
See application file for complete search history.

(56) References Cited

U.S. PATENT DOCUMENTS

| | | | |
|---|---|---|---|
| 6,496,935 B1 | 12/2002 | Fink et al. | |
| 6,650,640 B1* | 11/2003 | Muller et al. | 370/392 |
| 6,788,683 B1* | 9/2004 | Ikeda et al. | 370/389 |
| 7,065,050 B1 | 6/2006 | Herbst | |
| 7,411,910 B1* | 8/2008 | Frink et al. | 370/235 |
| 7,715,438 B1 | 5/2010 | Frink et al. | |
| 7,779,144 B2* | 8/2010 | Quinn et al. | 709/232 |
| 7,844,688 B2* | 11/2010 | Shamia et al. | 709/220 |
| 8,072,894 B2* | 12/2011 | Shi et al. | 370/252 |
| 8,239,340 B2 | 8/2012 | Hanson | |
| 8,416,773 B2 | 4/2013 | LaVigne et al. | |
| 2006/0013136 A1 | 1/2006 | Goldschmidt et al. | |
| 2007/0230445 A1 | 10/2007 | Barrie et al. | |
| 2008/0201772 A1 | 8/2008 | Mondaeev et al. | |
| 2009/0303990 A1 | 12/2009 | Ambrose et al. | |
| 2011/0032554 A1 | 2/2011 | Matsuhira | |

(Continued)

FOREIGN PATENT DOCUMENTS

WO    WO 01/65343 A1    9/2001

OTHER PUBLICATIONS

RFC 768, User Datagram Protocol, Aug. 28, 1980.
RFC 1071, Computing the Internet Checksum, Sep. 1988.

(Continued)

*Primary Examiner* — Warner Wong
(74) *Attorney, Agent, or Firm* — Duane S. Kobayashi

(57) ABSTRACT

A system and method for efficient matching regular expression patterns across multiple packets. A deep packet inspection system can be embodied in a switch ASIC using a flow tracker and a signature matching engine. The flow tracker can be positioned in an ingress portion of the switch ASIC at a location where packets in a bi-direction flow can be observed and recorded. The flow tracker generates a signature match request that is forwarded to a signature matching engine in an auxiliary pipeline. The signature matching engine is enabled to perform cross-packet signature matching using signature matching state machines and reports the signature matching results to the flow tracker using a response packet that is sent to the ingress pipeline.

13 Claims, 14 Drawing Sheets

(56) References Cited

U.S. PATENT DOCUMENTS

| | | | |
|---|---|---|---|
| 2011/0032944 A1 | 2/2011 | Elzur et al. | |
| 2011/0055425 A1* | 3/2011 | Patel et al. | 709/238 |
| 2011/0134920 A1* | 6/2011 | Dyke | 370/392 |
| 2011/0252046 A1 | 10/2011 | Szabo et al. | |
| 2012/0057460 A1* | 3/2012 | Hussain et al. | 370/235 |
| 2012/0189004 A1 | 7/2012 | Hendel | |
| 2012/0236722 A1 | 9/2012 | Patel et al. | |
| 2012/0280799 A1 | 11/2012 | Singh et al. | |
| 2013/0136127 A1 | 5/2013 | Hill et al. | |

OTHER PUBLICATIONS

RFC 2460, IPv6 Specification, Dec. 1998.
RFC 2697, A Single Rate Three Color Marker, Sep. 1999.
RFC 3917, Requirements for IP flow Information Export (IPFIX), Oct. 2004.
Application Layer Packet Classifier for Linux, Jan. 7, 2009.
CISCO, Classifying Network Traffic Using NBAR, Nov. 5, 2010.
Yu et al., Fast and Memory-Efficient Regular Expression Matching for Deep Packet Inspection, May 22, 2006.
JLex: A Lexical Analyzer Generator for Java, Feb. 7, 2003.
LBNL/ICSI Enterprise Tracing Project, 2005.
CISCO, Network Based Application Recognition Performance Analysis, Sep. 2008.
RFC 4987, TCP SYN Flooding Attacks and Common Mitigations, Aug. 2007.
RFC 793, Transmission Control Protocol DARPA Internet Program Protocol Specification, Sep. 1981.
V8 (a.k.A. Henry Spencer, a.k.a. kernel) Regular Expressions, Jun. 4, 1993.
Gonzalez, et al., Shunting: A Hardware/Software Architecture for Flexible, High-Performance Network Intrusion Prevention, 2007.
EP Search Report, Feb. 6, 2013.
KIPO Office Action, Dec. 24, 2013.

\* cited by examiner

| Field | bits | Description |
|---|---|---|
| Parity | 1 | Even parity bit for entry |
| Valid | 1 | Indicates that entry is valid |
| Key Type | 2 | Indicates key type stored in the entry<br>00: Reserved Key<br>01: IPv4 Key<br>10: Upper IPv6<br>11: Lower IPv6 |
| Reserved | 6 | Reserved fields |
| Static | 1 | When set, flows in the "Active" state are not subject to retirement via inactivity timeouts or tcp_end detection |
| L4_pkt_cnt | 4 | Number of packets sent to SME |
| L4_btye_cnt | 14 | Number of L4 payload bytes sent to SME |
| Sent_timestamp | 16 | Indicates timestamp last packet was sent to SME, overlayed on top of L4_byte_cnt, L4_pkt_cnt |
| Event_id | 3 | b[0]: New flow event triggered<br>b[1]: Results packet event triggered<br>b[2]: Retired flow event triggered |
| TCP RESET | 1 | RST seen in either direction for this flow. |
| TCP Fin R | 1 | Reverse FIN seen for this flow. |
| TCP Fin F | 1 | Forward FIN seen for this flow. |
| Vlan_F | 12 | Vlan of first packet in the forward direction |
| Vlan_F_valid | 1 | Indicates Vlan_F field is valid |
| Vlan_R | 12 | Vlan of first packet in the reverse direction |
| Vlan_R_valid | 1 | Indicates Vlan_R field is valid |
| Dest_sme | 2 | b[0]: Sent to Internal Engine for processing<br>b[1]: Sent to External Engine for processing |
| Eop_pend | 2 | Indicates number of eops pending for regular packets |
| Res_eop_pend | 2 | Indicates number of eops pending for results packets |

From FIG. 2

| | | |
|---|---|---|
| Retired_code | 3 | Reason code for retired entry<br>0: None<br>1: New_End: Indicates tcp_end was detected in "New" state<br>2: New_Timeout: Indicates inactivity timeout was triggered in "New" state<br>3: Sme_Released: Indicates sme_results with keep_flow=0<br>4: CmdWait_end: Indicates tcp_end was detected in CmdWait State<br>5: CmdWait_Timeout: Indicates timeout with no results from SME.<br>6: Active_End Indicates tcp_end was detected in "Active" state<br>7: Active_Timeout: Indicates inactivity timeout was triggered in "Active" state |
| Suppress_act | 1 | Indicates that policy action should be suppressed. Set by VFP "count_only" action |
| SME_results_valid | 1 | Indicates that SME results in session table are valid |
| SME_keep | 1 | Indicates that flow should be kept in session table and proceed to active state |
| SME_match | 1 | Indicates match from SME |
| SME_apply_act | 1 | Indicates that policy action should be applied to flow |
| SME_error | 1 | Indicates error flag set in SME results packet |
| SME_final | 1 | Indicates final result from SME |
| HTTP persistent | 1 | Indicates http persistent flow |
| Age_profile | 4 | Index into profile table that gives signature based inactivity timeout value. |
| Policy index | 8 | Indicates policy index to be looked up for flow actions |
| Signature id | 10 | Indicates signature ID matched in SM Engine |
| key_direction | 1 | Indicates direction of flow as stored in the keys |
| flow_state | 3 | Indicates current state of flow |
| Last timestamp | 16 | Timestamp of last packet seen of this session |
| Start timestamp | 16 | Timestamp of first packet seen of this session |
| ID_timestamp | 16 | Flow creation timestamp used for identifying and validating the flow. |
| Key | 104 | IPv4, Upper/lower half of IPv6 key |
| Total | 256 | |

SESSION TABLE FIELDS

*FIG. 2(Continued)*

| IP Generated Fields | | | |
|---|---|---|---|
| Field | Bits | Timing | Description |
| First | 1 | EOP | Indicates first packet in the flow |
| Last | 1 | EOP | Indicates last packet sent to SM Engine |
| Packet_num | 4 | EOP | Indicates packet sequence number |
| FT_error | 1 | EOP | Error dected. Do not process contents of this packet |
| Direction | 1 | SOP | Indicates direction of the flow |
| Timestamp | 16 | SOP | Indicates start timestamp of the flow |
| Flow index | 13 | SOP | Indicates flow id of current packet |
| Total | 37 | | |
| EP Generated Fields | | | |
| Field | Bits | Timing | Description |
| L4_Protocol | 8 | SOP | Indicates IP protocol |
| L3_Header_offset | 8 | SOP | Indicates L3 header offset in packet |
| L4_Header_offset | 8 | SOP | Indicates L4 header offset in packet |
| L4_payload_offset | 9 | SOP | Indicates L4 payload offset |
| IP_fragment | 1 | SOP | Indicates fragment packet |
| Total | 33 | | |

| RV ENTRY 7 | RV ENTRY 6 | RV ENTRY 5 | RV ENTRY 4 | RV ENTRY 3 | RV ENTRY 2 | RV ENTRY 1 | RV ENTRY 0 |
|---|---|---|---|---|---|---|---|
| RV ENTRY n+7 | RV ENTRY n+6 | RV ENTRY n+5 | RV ENTRY n+4 | RV ENTRY n+3 | RV ENTRY n+2 | RV ENTRY n+1 | RV ENTRY n |

← DFA MEMORY ENTRY (256-BITS) →

FIG. 8

| BIT MAP (256b) | | | | | | | | | | | | | | | |
|---|---|---|---|---|---|---|---|---|---|---|---|---|---|---|---|
| nST Ptr 14 | nST Ptr 13 | nST Ptr 12 | nST Ptr 11 | nST Ptr 10 | nST Ptr 9 | nST Ptr 8 | nST Ptr 7 | nST Ptr 6 | nST Ptr 5 | nST Ptr 4 | nST Ptr 3 | nST Ptr 2 | nST Ptr 1 | Default Ptr | Info (16b) |
| nST Ptr 29 | nST Ptr 28 | nST Ptr 27 | nST Ptr 26 | nST Ptr 25 | nST Ptr 24 | nST Ptr 23 | nST Ptr 22 | nST Ptr 21 | nST Ptr 20 | nST Ptr 19 | nST Ptr 18 | nST Ptr 17 | nST Ptr 16 | nST Ptr 15 | Info (16b) |
| ... | ... | ... | ... | ... | ... | ... | ... | ... | ... | ... | ... | ... | ... | ... | Info (16b) |
| | | | | | | | | | | | | | nST Ptr 256 | nST Ptr 255 | Info (16b) |

← DFA MEMORY ENTRY (256-BITS) →

| Field | Size (bits) | Description |
|---|---|---|
| Flow_entry_valid | 1 | Entry is valid |
| Flow_Timestamp | 16 | |
| Flow_Error | 1 | Not all packet for this match were received |
| Next_packet_num | 4 | Next expected packet number |
| Total_bytes_matched | 13 | |
| Best_match_valid | 1 | |
| Best_match | 10 | Index into full SM_Match_Table. |
| Cross_sig_flags | 16 | First 16 cross signature flags (CSF[15:0]) |

FLOW TABLE FIELDS

*FIG. 11*

| Field | Size (bits) | Description |
|---|---|---|
| Match_entry_valid | 1 | Entry is valid |
| Match_cross_sig_flag_clear | 1 | Clear indexed cross signature flag |
| Match_cross_sig_flag_set | 1 | Set indexed cross signature flag |
| Match_cross_sig_flag_index | 9 | Index of cross signature flag to set or clear |
| Match_priority | 8 | |
| Match_report_level | 2 | 0X00: no report<br>0X01: hold report<br>0X10: send report<br>0X11: final report |
| Report_packet_header_only | 1 | |
| Report_copy_to_cpu | 1 | |
| Report_HTTP_persistent | 1 | |
| Report_keep_flow | 1 | |
| Report_apply_action | 1 | |
| Report_policy_idx | 8 | |
| Report_inactivity_idex | 4 | New active state aging value |
| Report_signature_id | 10 | Signature id to report |
| Check_cross_sig_flag_is_cleared | 1 | Flag must be cleared |
| Check_cross_sig_flag_is_set | 1 | Flag must be set |
| Check_cross_sig_flag_index | 9 | Index of flag to check |
| Check_contiguous_flow | 1 | All packets required |
| Check_pkt_direction | 2 | 0X00: Reserved<br>0X01: Forward only<br>0X10: Reverse only<br>0X11: Either |
| Check_L4_payload_length_max | 14 | Minimum dsize, payload length must be less than or equal |
| Check_L4_payload_length_min | 14 | Maximum dsize, payload length must be greater than or equal |
| Check_L4_protocol | 2 | 0X00: Reserved<br>0X01: TCP only<br>0X10: UDP only<br>0X11: Either is ok |
| Check_L4_port_mode | 1 | 0: Range<br>1: Mask/equal |
| Check_L4_port_select | 2 | 0X00: Determine based on direction |

MATCH TABLE FIELDS

*FIG. 12*

| MACDA (6 BYTES) | MACSA (6 BYTES) | VLAN (4 BYTES) | TYPE (2 BYTES) | RES-HEADER (8 BYTES) | ORIGINAL L2 PACKET | FCS (4 BYTES) |

FIG. 13A

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| Opcode=1 | | RESULTS FLAGS | | | | | | | | AGE INDEX | | | | | | SIGNATURE ID | | | | | | | | POLICY INDEX | | | | | | | |
| TIMESTAMP | | | | | | | | | | | | | | | | Rsvd=0 | | | | | | | FLOW INDEX | | | | | | | | |

FIG. 13B

| 2 | 3 | 4 | 5 | 6 | 7 | 8 | 9 |
|---|---|---|---|---|---|---|---|
| Reserved=0 | MATCH VALID | FINAL REPORT | KEEP FLOW | APPLY ACTION | SM ERROR | COPY TO CPU | HTTP PERSISTENT |

FIG. 13C

| Field | Bits | Description |
| --- | --- | --- |
| Match_valid | 1 | Indicates signature match |
| Final_report | 1 | Indicates final match |
| Keep_flow | 1 | Indicates flow should be kept in session table and proceed to active state |
| Apply_action | 1 | Indicates policy action should be applied to flow |
| SM_error | 1 | Indicates error was detected during signature match processing |
| Copy_to_cpu | 1 | Indicates results packet should be copied to cpu |
| Http_persistent | 1 | Indicates http persistent flow |
| Policy_index | 8 | Indicates policy index for actions |
| Signature_id | 10 | Indicates id of signature that matched |
| Timestamp | 16 | Indicates start timestamp of the flow |
| Flow index | 13 | Indicates flow id index |
| Age index | 4 | Indicates dependent inactivity timeout index |
| Total | 58 | |

FIG. 14

SYSTEM AND METHOD FOR EFFICIENT MATCHING OF REGULAR EXPRESSION PATTERNS ACROSS MULTIPLE PACKETS

This application claims priority to provisional patent application No. 61/565,423, filed Nov. 30, 2011, which is incorporated by reference herein, in its entirety, for all purposes.

BACKGROUND

1. Field of the Invention

The present invention relates generally to network systems and, more particularly, to a system and method for efficient matching of regular expression patterns across multiple packets.

2. Introduction

Deep packet inspection (DPI) systems can enable sophisticated services such as intrusion detection, traffic shaping, and load balancing. A key element of such DPI systems is a signature matching engine that is designed to match packet payloads to multiple known signatures. Increasing network speeds place an increased burden on DPI systems in accommodated the increased performance requirements. Prior solutions to date require addition of expensive external processors, often with specialized accelerator hardware. What is needed therefore is a DPI system and method that can perform efficient matching of regular expression patterns across multiple packets.

SUMMARY

A system and/or method for efficient matching of regular expression patterns across multiple packets, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2 illustrates an example of a session table.

FIG. 3 illustrates an example of ingress-pipeline generated and egress-pipeline generated fields in a header passed with each packet to a signature match engine.

FIG. 7 illustrates an example of a RangeValue encoding layout.

FIG. 8 illustrates an example of a BitMap encoding layout.

FIG. 11 illustrates an embodiment of fields in a signature match flow table entry.

FIG. 12 illustrates an embodiment of fields in a match table entry.

FIGS. 13A-13C illustrates an example format of a results packet.

FIG. 14 describes fields in a results header.

DETAILED DESCRIPTION

Figure 1:
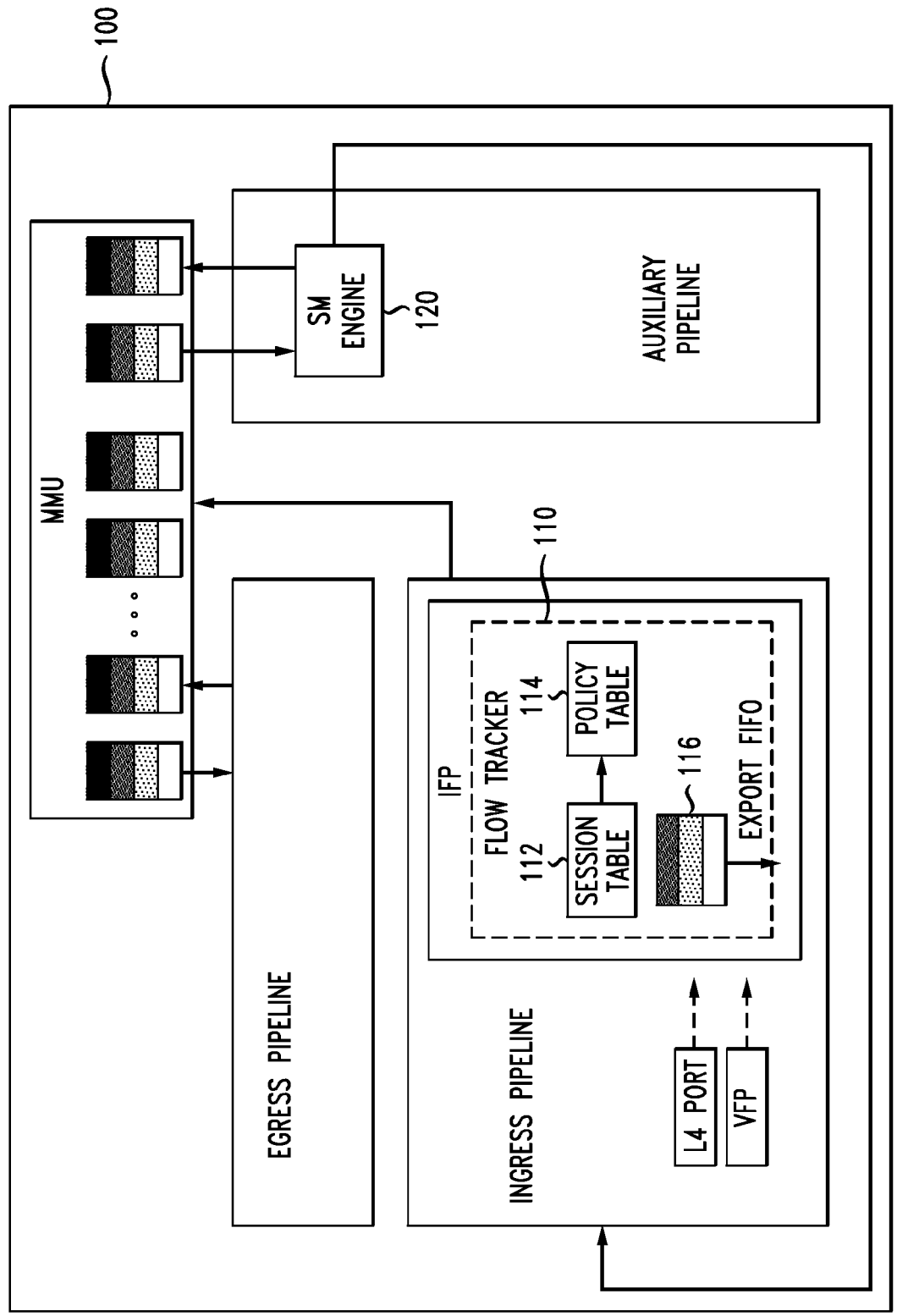
FIG. 1 illustrates a block diagram for the components of an example flow tracker.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In the present invention, DPI refers generally to a mechanism in which packets in a flow can be inspected to determine the underlying application. Almost all applications of interest can be recognized by looking for "telltale" patterns in the first 2K bytes of application data exchanged, although some may require more. For a significant number of applications, conclusive match data does not occur in a single packet, but instead requires matching patterns in multiple packets for a flow.

In accordance with the present invention, flow tracking enables selecting out those initial packets for a flow with payload data and sending copies for signature matching. Since signature matching is done on just these sampled packets, it need not be done at the system packet throughput rate.

In accordance with the present invention, DPI can be used to extend a conventional classification in that it is able to go beyond the L2-L4 headers and look through the entire packet for additional information. It therefore provides the ability to inspect arbitrary fields in the payload and to match these with known signatures of the most common applications. Once identified, it provides the ability to police these flows through various means, such as rate meters, quality of service queuing, redirection, packet filtering, or the like.

In the present invention, DPI can be enabled through two primary units: a signature matching (SM) engine and a flow tracker. The SM engine provides the ability to inspect arbitrary fields in the payload of the packets. It can be embodied as a regular expression matching state machine that looks for signatures, or common patterns found in specific applications, and indicate a match if one is found. It can be responsible for the processing and identification of flows once they have been queued for inspection.

Flow management and policy actions are handled by the flow tracker. The flow tracker is needed because the payload required to identify applications may not necessarily be contained in a single packet. It therefore provides a means of storing and tracking a large number of these groups of packets that make up flows. In operation, the flow tracker can assemble and format the flows into byte streams so that regular expression matching can be done. In addition, once flows are classified, the flow tracker can provide a means of tracking these flows and applying actions to packets of that flow.

Flow tracker processing can be broken down and grouped into a set of basic functions that are listed below.

Identify Flows: Parse incoming packets. Identify flows of interest.

Track Flows: Create state entry and maintain flow status

Direct Packets for Inspection: Forward packets to SM engine for signature matching Process signature matching results: Get signature matching results, update policy, CPU notification Apply actions: Apply signature policy actions on subsequent packets Terminate flows: Identify when flows should be terminated and no longer flow tracked Report statistics: Generate record with statistics and export to CPU FIG. 1 illustrates a block diagram of the components of the flow tracker and how the flow tracker fits into the pipeline structure of a switch fabric core chip 100. As illustrated, flow tracker 110 can be broken down into two main structures: flow tracker session table 112 and flow tracker policy table 114. As the names imply, session table 112 can be responsible for identifying and maintaining the state of the flows, whereas policy table 114 can be responsible for applying the actions to flows once they have been classified. Session table 112 can hold all the information about the flow, including the key, state, counters, and policy index. Policy table 114 can hold the actions that can be applied to packets in the flow once it has been classified. Both these tables can be situated in the ingress pipeline in the ingress field processor (IFP) stage. As further illustrated, flow tracker session table 112 also has an attached export FIFO 116 to report flow status and packet/byte counters when the flow has ended.

SM engine 120 can be situated in the auxiliary pipeline (AXP). In one embodiment, there is no direct interface between flow tracker 110 and SM engine 120. Instead, communication between flow tracker 110 and SM engine 120 can be enabled through a header enqueued with each packet.

The flow tracker session table can be placed in a location where all packets of a bi-directional flow can be observed and recorded. In a single pipeline implementation, there is a lot of flexibility since all packets follow the same path when they are processed. Any location in the ingress or egress pipelines would see all the packets in a bi-directional flow. In the multiple pipeline case where each pipeline only sees packets for a subset of ports, the session table can be shared across the pipelines. This guarantees that both directions can be tracked. Alternatively, the session table can be located such that it is accessible by both ingress and egress pipelines. Here, instead of tracking all the flows as it ingresses the chip, tracking would focus on packets that ingress from front panel ports and packets that egress to front panel ports. This works because the packets in the forward and reverse paths of the bidirectional flow would travel through the same front panel port. This port-pair grouping would allow flows from different front panel ports to be tracked independently, and allows a means for scaling to multiple pipelines. Splitting the session table into smaller chunks increases the lookup bandwidth by a proportional amount. As long as the same instance of the session table tracks the front panel port pair, it can be split into an arbitrary number of chunks.

In the description below, a single observation point in the ingress pipeline is used, wherein all incoming traffic is recorded as it ingress the chip and all flow tracking actions are applied in the ingress pipeline. As would be appreciated, the principles of the present invention are not limited to such an implementation.

To illustrate the flow identification functionality of the flow tracker, consider an example of inspecting IP packets with the TCP/UDP L4 protocol. Here, flows can be identified by the standard 5-tuple (IP source and destination address, L4 source and destination ports, and IP protocol), and can be tracked for the entire duration of the connection. Flow creation and termination can be detected by observing the flags inside the packets (TCP connections). Connections are bi-directional, so both directions of the flow can be detected and processed. It should be noted that while the description below references example TCP/UDP flows, the principles of the present invention are not limited to such flow types.

Flow tracking can be enabled on a per physical port basis or on a WLAN virtual port basis. There can be various configuration options that can selectively filter which types of packets are allowed to create flow tracker entries.

Flow tracking per-port properties can come from one of four sources: the ingress physical port, the egress physical port, the source virtual port or the destination virtual port. If any of the four sources is enabled, then the flow would be eligible for flow creation.

Incoming packets are eligible for flow tracking if they ingress on a flow-tracked port or if they egress out on a flow-tracked port. In one example, flows that are coming in or going out of front-panel ports are tracked. This can be accomplished if there are two observation points, one as the packet ingresses on a port and the other as it egresses the port. In one embodiment, only one observation point is used in the ingress pipeline.

In one embodiment, some pre-filtering can be done to limit the packets that should be considered for flow tracking This pre-filtering can accommodate the limited resources that dictate how many flows can be tracked and signature matched. Additionally, flow tracking need not be done on every type of packet. Here, certain restrictions can be applied to simplify the implementation. In general, the scope of the flow tracking can consider the capabilities of the SM engine, the capacity of the flow tracker, and the flows of interest that should be tracked.

Once flow identification and eligibility is resolved, it can be determined when is the appropriate time to begin tracking a flow. For TCP connections, inspecting the first few packets of the exchange is usually sufficient for identifying the underlying application. For many signatures, the data required to match occurs early in the flow, and is available only once for the whole duration of the flow. For this reason, flow tracking for TCP flows can be initiated when the start of a new TCP connection is detected, denoted by a SYN or a SYN-ACK packet. For UDP flows, there is no equivalent indicator for the start of a flow, so the first packet seen can be taken as the initiating packet. Once it is determined that a flow needs to be tracked, the flow's state can be maintained so that it can be processed in an orderly manner. The data structure created to maintain this state for all the tracked flows is known as the session table.

To identify the underlying applications running through the switch, the SM engine needs access to data that will straddle multiple packets in a TCP/UDP flow. In the present invention, a data structure is constructed that can identify and store state for incoming TCP/UDP flows. Signature matching results from the SM engine on identified flows are also stored and applied to subsequent packets of flows that have been identified. The standard 5-tuple can be used to identify the flows and as the key for indexing into the session table. One example of the session table fields is illustrated in FIG. 2.

The SM engine can inspects packets in both directions of a TCP/UDP flow. To accommodate this, the session table can be set up such that each entry tracks packets in both directions. The 5-tuple for the two directions are basically identical, with the difference being that the source/destination fields are swapped. The keys can be normalized so that hashing will produce the same results independent of direction. This can be done via a simple arithmetic compare of the source and destination IP addresses. A direction bit can be stored in the entry to indicate the order of storage.

Once a flow entry has been created in the session table, packets in that flow are sent to the SM engine for processing. Ideally, all packets are sent to the SM engine until it is able to generate a match. Buffering and processing requirements may make this impractical, however. Accordingly, the flow tracker can be designed to send only the first N packets (or bytes) of the flow, to guarantee that a set number of flows can be buffered and processed. This is likely sufficient because, for the bulk of the applications of interest, the data required is contained in the first few packets of the flow.

As illustrated in FIG. 1, SM engine 120 is included in the AXP. As noted, in one embodiment, there is no direct interface from flow tracker 110 to SM engine 120. Instead, information can be relayed through a header that is attached to each packet that is forwarded to SM engine 120. Part of the header can be computed in the ingress pipeline, and the other part can be added when the packet is dequeued and is processed by the egress pipeline. FIG. 3 illustrates an example of the ingress-pipeline generated and egress-pipeline generated fields in the header that are passed with each packet to SM engine 120.

The stream of packets sent to the SM engine are annotated with first and last flags. These flags can be used to align and delimit flows being tracked and sent for processing. A flow index can be passed with each packet indicating to which of the flows the packet belongs. The SM engine can begin processing as soon as data becomes available for any of the flows. It need not wait for all the packets of the flow to become available. Each flow tracker entry logs traffic in both directions of the connection, so the header can provide a direction bit indicating whether the packet is part of the forward or reverse path.

All the packets in a flow can be tagged with a timestamp that serves as an ID for the flow. This can be used to check for flow consistency when packets are being dequeued by the SM engine. An inconsistent timestamp value received from the flow tracker can indicate that either an error occurred or that a new flow has been created and is being tracked at the same flow index. In either case, the SM engine should stop processing on the current flow, log an error, and initiate processing on the new flow if the start flag is detected.

The flow tracker can add a local sequence number (Packet_num) to the header of each packet that is forwarded to the SM engine. This number represents the order of the packets as they are seen by the flow tracker. The SM engine can use this number to confirm that no packets were lost in the MMU. The total number of packets sent can be determined by looking at the packet with the LAST flag set. Here, it should be noted that this count is shared for both directions of the flow. The error bit indicator (FT_error) signals that some sort of error was detected and that the packet should not be processed. In this case, no further packets would be sent for this flow. The SM engine should then attempt to signature match with the preceding packets that were sent.

The packets can be pre-parsed before they are presented to the SM engine so that relevant offsets into the packet can be extracted. Offset computation can be done by the egress pipeline just before they are sent to the AXP where the SM engine resides. It should be noted that these offsets do not have to be stored in the MMU with each packet. Thus, there is a relatively low cost in having the egress pipeline extract this information.

The maximum number of bytes and packets sent to the SM engine can be configurable. The flow tracker can forward packets for processing until a maximum payload threshold (e.g., 2 k bytes), a maximum packet threshold (e.g., 10), or the like is exceeded. The flow tracker can be configured to track the number of packets/bytes sent to the SM engine and also track the cumulative total number of packets/bytes seen for the flow.

In general, the SM engine uses programmable state machines to do a pattern match on the L4 payloads of the first few packets in a flow. If a match is identified, a message is sent to the flow tracker, enabling actions of future packets in the same flow. In one embodiment, the SM engine is implemented as a non-linerate function inside the AXP.

Figure 4:
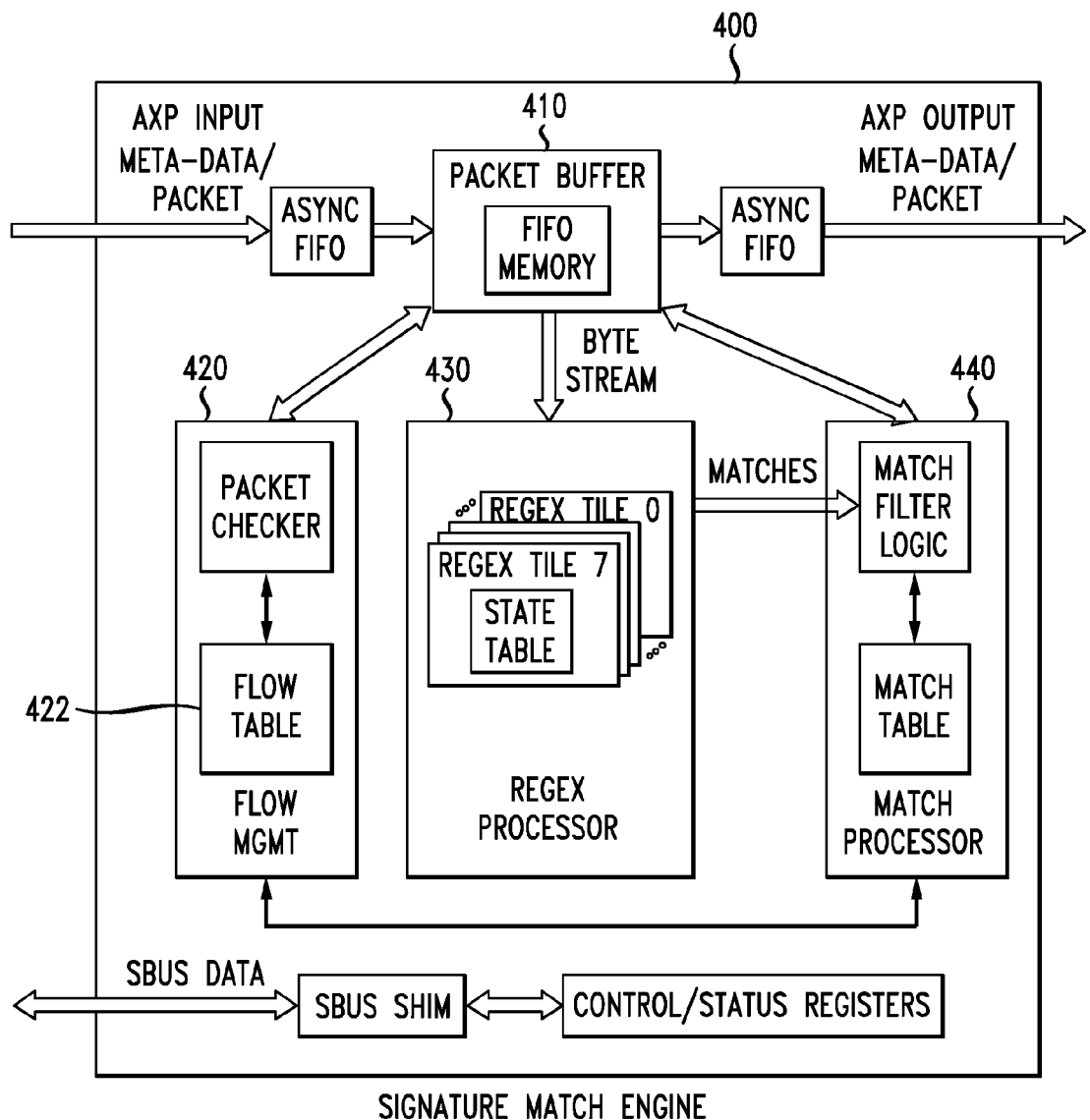
FIG. 4 illustrates an embodiment of a signature match engine.

FIG. 4 illustrates an embodiment of the SM engine. As illustrated, SM engine 400 has four major sub-blocks: packet buffer 410, flow management 420, regex processor 430 and match processor 440. Packet buffer 410 receives packets and meta-data, buffers it, and sends report packets if needed. Flow management 420 handles flow validation, and stores match data in signature match flow table 422. Regex processor 430 contains the programmable state machines. In one embodiment, regex processor 430 has 32 programmable state machines that are grouped into eight regex tiles. Finally, match processor 440 resolves the best match after checking other qualifiers, and if needed, sends a message with the packet to the flow tracker in the switch pipeline. In addition to the four major sub-blocks, SM engine 400 includes registers for control and status.

Figure 5:
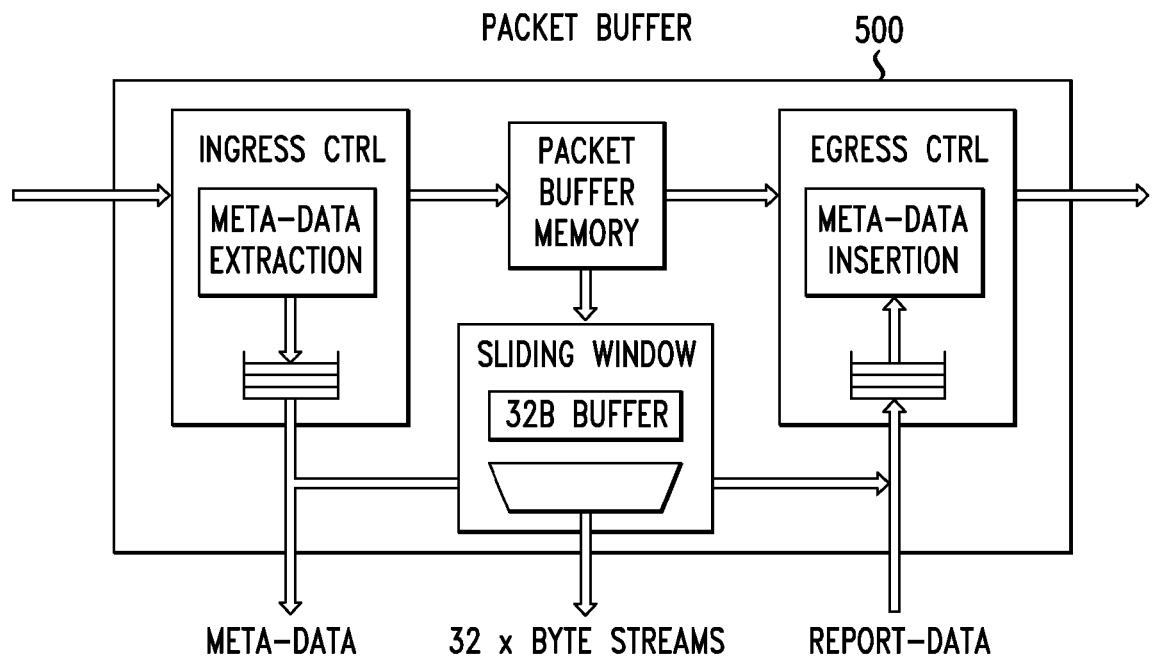
FIG. 5 illustrates an example of a packet buffer.

Packet buffer 410 manages the packet and header data through SM engine 400. FIG. 5 illustrates an embodiment of a packet buffer in greater detail. In one embodiment, there are four packet flows in and out of packet buffer 500. Packet data arrives from the AXP. When a packet is received, the meta-data and certain header fields are written to a 16-entry queue. Also, the complete packet is stored in memory.

The regex engines read and process the payload. The regex engines interface with packet buffer 500 through a 32-byte cache, holding four memory lines. Each regex engine can independently process any byte in this window of data.

If there is a match or the packet is marked as the last packet, the match information and header fields are placed in a 4-entry queue to be egressed. The packet is then sent out the AXP interface to the flow tracker, together with any match information.

In one embodiment, the packet buffer can be enabled to perform several packet checks to determine if the packet is valid for matching, or if it should be dropped. Dropped packets produce no match results and the intermediate packet state would be discarded. For example, the packet buffer can be responsive to AXP control signals, flow tracker error signals (e.g., the FT header includes an error bit to invalidate a packet already queued for signature matching), TCP/UDP checksum, packet length (e.g., IP length less than or equal to the actual number of payload bytes received), etc.

Flow management 420 includes the SM flow table lookup, flow validity checks, and stores flow results for future packets in the same flow. Once a packet has been determined to be valid, the regex engines begin matching.

SM flow table 422 in the SM engine is a slave to the flow tracker. The flow tracker will associate a flow with an index and provide that index to the SM engine. The signature match does a lookup in SM flow table 422. When matching has completed, the state of the flow is written back to SM flow table 422.

If the arriving packet is marked as a first packet, the SM flow table entry is initialized based on the header and meta-data. Then the regex engines begin matching the packet. Otherwise, if the packet is not a first packet, several different checks are made against the previous flow data from SM flow table 422. If all checks pass, the regex engines begin matching.

Control registers can be used to determine how flow check failures are handled. If an enabled check fails, the packet is dropped, counted, a status bit is set, and no matching is done. If a check is disabled, a failed check is still counted and the status bit is set, but the current flow values are inserted into the table and a 'missed packet' flag is set indicating the failure.

A key element of the SM engine is a group of memory-based state machines designed to match a packet byte stream against a large set of regular expressions in parallel. In one embodiment, the SM engine has 32 regex engines accessing a total of 1 MB of on-chip memory used for storing the state trees and the multi-packet mode context.

Figure 6:
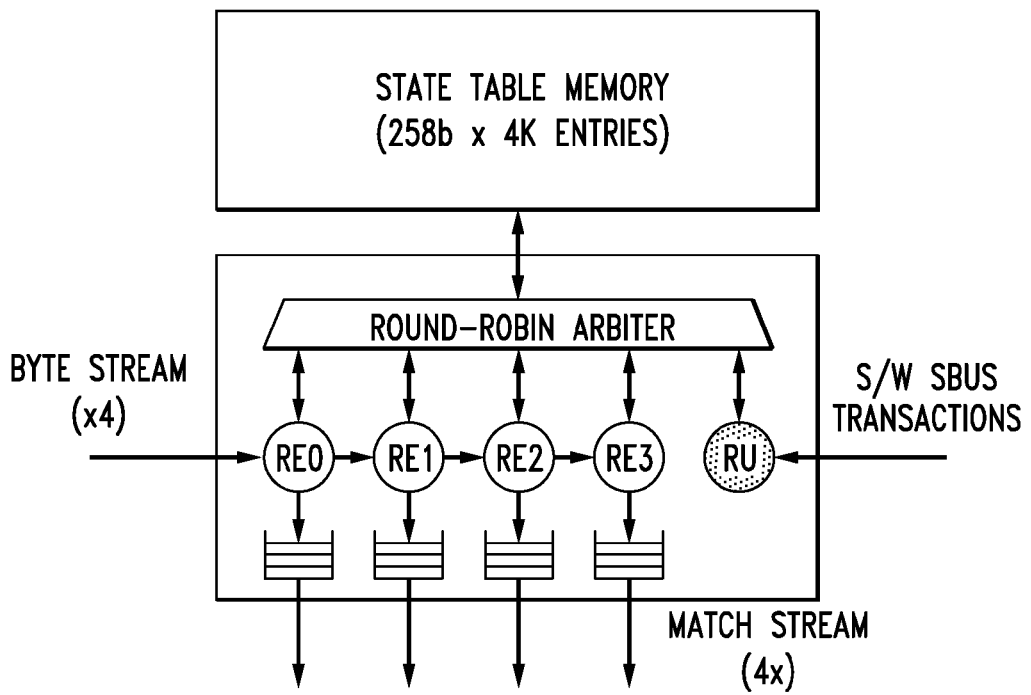
FIG. 6 illustrates an example of a having four regex engines.

These 32 regex engines and the on-chip memory can be split evenly among eight tiles. As shown in FIG. 6, each tile can have four regex engines sharing a 128 KB single-port memory. The four independent regex engines (RE0,RE1, RE2,RE3) receive a byte stream corresponding to the input packet's application payload (e.g., Layer 4 payload). For each byte, a regex engine issues one or more memory reads to fetch the "current state" information which is used to determine the "next state" of the state tree. This sequence is repeated until reaching the end of the packet. A regex engine outputs a match ID whenever a "match state" is detected. These matches are the forwarded to the match processor.

In one embodiment, the regex state table memories are 258 bits wide and 4 k entries deep. Each line includes 2 bits of encoding type and 32 bytes of state table data. Up to four regex engines and one software-access port share a single state table memory. They operate in round-robin between those currently active. Those that are inactive are skipped allowing the others to utilize the memory bandwidth.

For each tile, the state table is a 128 KB memory holding states, transitions, and multi-packet state context for up to four regex engines. The state table information allows the regex engine to determine the next state based on current state and data byte.

If enabled, a regex engine can manage multi-packet state context in a data structure (e.g., 2-16 KB) in the state table memory. In one embodiment, the SM engine can track up to 8 k unique flows. This is a single setting that affects all flow based tracking If the current state pointer is 16 bits or 16 cross signature flags are used, depending on the number of flows tracked, up to 16 KB of memory per engine can be reserved in the state table memory for this context. In one embodiment, state table information is not placed in the same region where context is stored. When multi-packet state context is not needed for a regex engine, that space can be used for additional state table information.

The multi-packet matching context space need not be initialized if there are no valid flows in the SM flow table. The first packet in the flow gets it start state from a register, then at the end of the packet saves it's state into the context region of memory. Only on the subsequent packets in the same valid flow is the start state determined by the multi-packet state context.

In one embodiment, there are two encodings supported for state and transition data, RangeValue and BitMap. RangeValue (RV) states are a variable length list of possible state machine transitions encoded as RangeValue entries. The RV entry encoding can include a next state pointer with a range of characters accepted. The range can be specified with a min and a max character (each with a character range of 0-255). Here, if max_char=min_char, then a single-character transition is specified, and if max_char>min_char, then a multi-character transition is specified. Additionally, special RV entry encodings can be used to indicate, for example, that the Match ID is located in the next state pointer field. An example RangeValue encoding layout is illustrated in FIG. 7.

Bitmap encoding, on the other hand, can include a 256-bit Bit-Map field to indicate which characters take non-default transitions. Each bit can correspond to an ASCII character's transition where '0' indicates a transition to the next default state and a '1' indicates a transition to a non-default next state indicated by the next state pointer list. Following the Bit Map field, all the valid "next state pointers" are placed continuously in memory (in the same order as encountered in the bit-map vector). The next state pointers follow with up to 15 pointers per line together with the Info field. The Info field is copied to every line so that only the line containing the pointer indicated by the bitmap must be read. In one embodiment, the Info field can include a match state field and a Match ID field. An example BitMap encoding layout is illustrated in FIG. 8.

The match processor main functions are to determine the best signature match out of all the matches reported by the regex engines associated with a given flow, to filter out matches reported by the regex engines that don't have the correct qualifiers associated with the signature (e.g., applies to a given L4 port range, or to UDP only, or match must occur at EOP), to forward the "best match" along with other metadata through the packet buffer to the flow tracker, and to update and check for cross signature flags.

Figure 9:
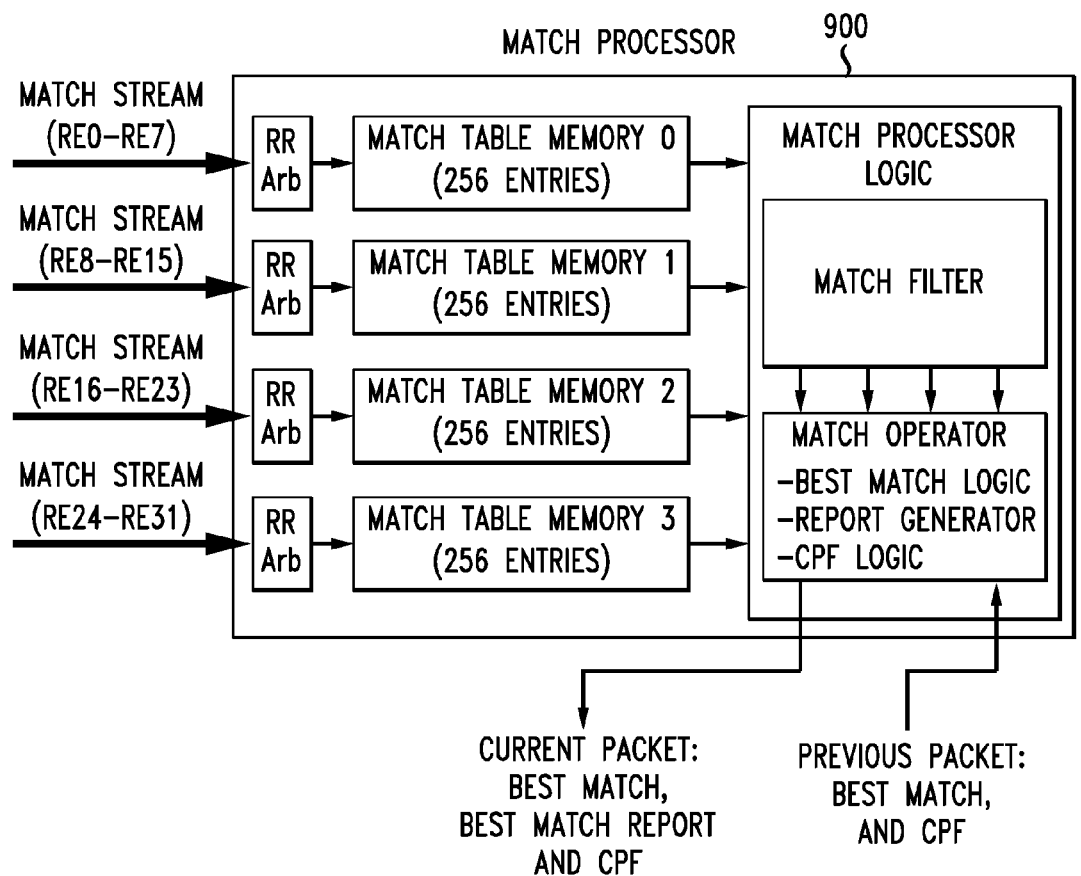
FIG. 9 illustrates an embodiment of a match processor.

FIG. 9 illustrates an embodiment of a match processor, As illustrated, match processor 900 receives 32 streams of matches from the regex processor (i.e., one per regex engine). Internally, they are grouped in blocks of eight and assigned to a dedicated 256-deep match table memory. A simple round-robin arbiter can be used to service one of the eight Match FIFOs and grant it access to the match table memories.

Since there are four distinct match table memories, match processor 900 can process a maximum of four matches per clock cycle. If every engine is producing a match on every byte, that would average 4-8 matches per cycle (depending on the number of memory lookups per state). Processing four matches per cycle gives the same worst case throughput, and under normal conditions would not be the limiting factor as matches should not be occurring on every byte from every engine.

For each match reported by the regex engines, match processor 900 reads the entry from the match table indexed by the Match ID. It then checks the qualifiers to determine if the match is valid. For example, some signatures apply only to packets with a given L4 port range. In this example, if the signature triggered, but the port range check fails, then the match is simply discarded.

Once a match has been qualified, match processor 900 then determines if it is a higher priority match than the one currently stored (if it is the first match then it is automatically stored). Each signature has a match report level and a match priority field associated with it. By considering these fields along with the Match ID, match processor 900 determines the best match to report.

Match processor 900 is designed to generate a report if the packet is marked last, even if no valid match was found. A report is also generated at the end of the current packet if the best match report level is 'final report' or 'send report'.

Figure 10:
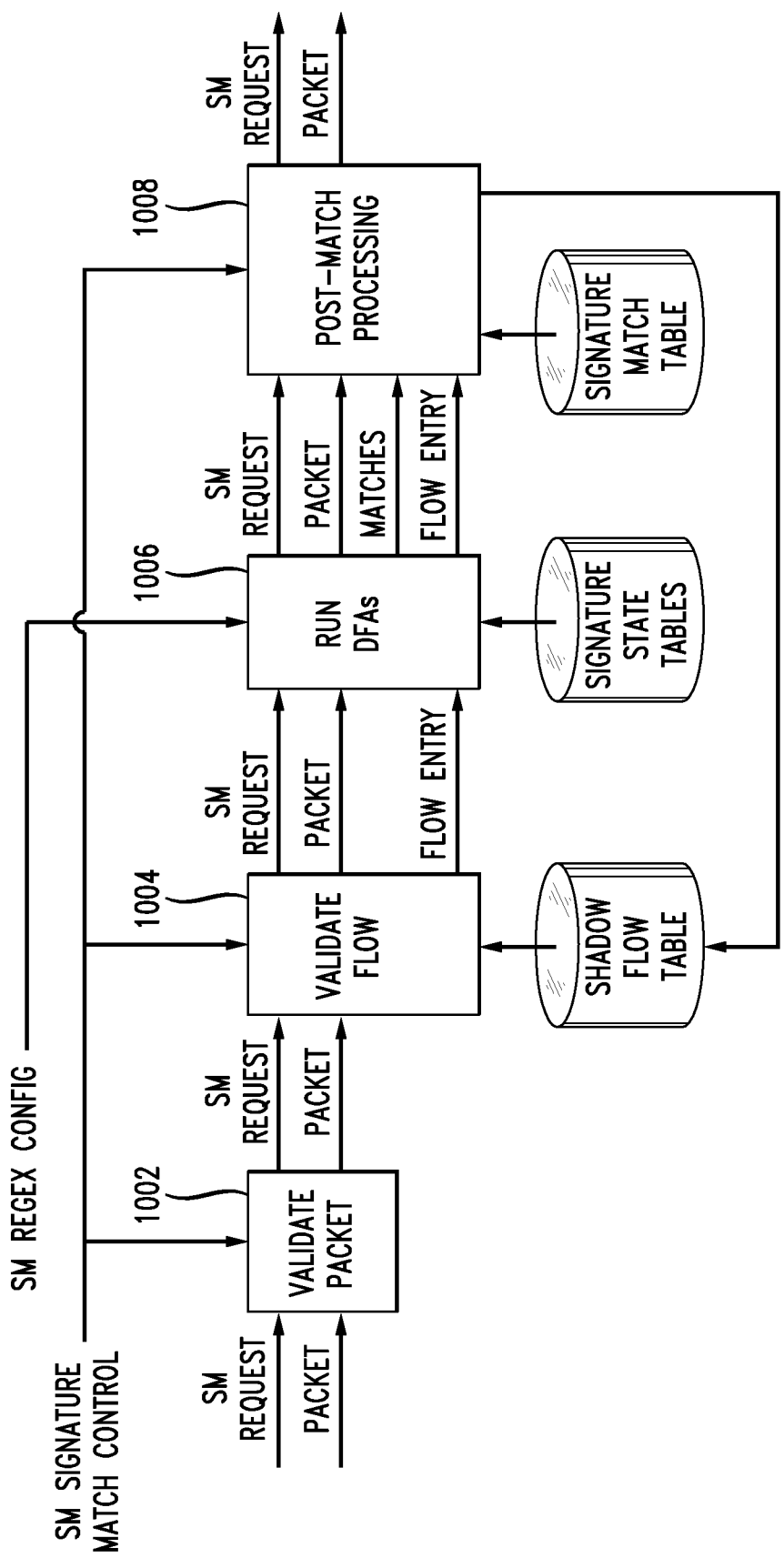
FIG. 10 illustrates an example of a signature matching packet flow.

To further illustrate the processing of the SM engine, reference is now made to FIG. 10, which illustrates the signature matching packet flow. As illustrated, the signature matching process begins at validate packet 1002. If the packet passes the validation, then the process continues to validate flow 1004. If the flow is validated, then the process continues to run deterministic finite state automata (DFA) 1006 to match the packet against multiple patterns simultaneously.

In general, a DFA is a graph of states where the bytes of the packet, together with the current state, determine what the next state will be. Some states in the graph will be match states, indicating a possible signature match. Regex engines traverse this graph using the state table representing this graph stored in memory. As would be appreciated, other types of state tables can be used without departing from the principles of the present invention.

Once the DFAs are run, the process continues to post-match processing 1008 to determine the best match so far, and then a response is sent to the flow tracker if indicated. Example processing within each stage of the signature matching packet flow is provided in detail below.

Packets can be validated by performing various checks. For example, a packet would not be processed if the packet has been marked as an error by the flow tracker. In another example, a determination can be made as to whether the length of the packet is sufficient to accommodate the L4 payload. This would detect, for example, whether a packet has been truncated in an intermediate system. In yet another example, a checksum validation can be performed to detect whether a packet has been corrupted in an intermediate system. As would be appreciated, the specific set of checks performed in the validation process can be implementation dependent.

As noted, signature matching maintains a slave flow table that is configured with the same number of entries as the flow tracker session table. This slave flow table is indexed by a flow index (Flow Id), which the flow tracker includes in the signature match request. FIG. 11 illustrates an embodiment of the fields in a signature match flow table entry.

When signature matching has a packet to process, it extracts the flow index and uses it to lookup the slave flow table entry. It then validates the flow by performing various processing such as matching the Flow_Timestamp to the timestamp in the signature match request to ensure that the packet belongs to an existing flow, checking the Flow_entry_valid field, checking if the Next_packet_num matches the packet number in the signature match request to ensure that the packet is the next expected packet, etc.

After the packet and the flow have been validated, signature matching can be performed. Signatures include two parts, the actual regular expressions to be matched and a set of match attributes. The regular expressions can be compiled by software into state tables used by the regex engines and stored in state table memory. This memory can be configurable so as to hold state tables and multi-packet matching state.

Each signature loaded into the state table can have a corresponding set of match attributes in the signature match table configured by software. Signature matching can be designed to handle signatures written as regular expressions. Regular expressions are then compiled into state tables and matched against packet payloads using regex engines.

A regular expression can represent a concise description of a set of strings, using the following constructions:

Alternation—a regular expression consists of zero or more branches, separated by '|'. A regular expression matches if at least one of the alternative branches matches.

Concatenation—a branch consists of a sequence of zero or more pieces. To match, a branch must match all of the pieces in the sequence, in the order specified.

Quantification (closure)—a piece consists of an atom possibly followed by one of the following characters: '*', '+', or '?' (these are referred to as repetition characters).

An atom followed by '*' matches a sequence of 0 or more matches of the atom.

An atom followed by '+' matches a sequence of 1 or more matches of the atom.

An atom followed by '?' optionally matches the atom or the null string.

An atom followed by a number enclosed in '{ }' matches a sequence of that exact number of matches of the atom.

An atom is one of the following:

Wildcard—'.' matches any single character. This must be able to include all characters, including newlines, but may be modified to exclude newlines as described below.

Start anchor—'^'—as the first character of a piece, matching the null string at the beginning of the packet payload, anchoring the piece at first byte. However, if the state table has cross-packet state enabled, the piece is anchored at the first byte of the logical "stream." This is the first byte of the payload in the first packet, which must come with the First flag set.

Stop anchor—'$' as the last character of a piece, matching the null string at the end of the packet payload, anchoring the piece at last byte. However if the state table has cross-packet state enabled, the piece must be anchored at the last byte of the logical "stream," i.e., the last byte matched for that flow.

Escape—'\' followed by a single character, matching a special character, e.g., '\r' to represent a return character, or '\w' to represent a whitespace character. A single '\' may be escaped by another '\'.

Literal hex—'\' followed by two hex characters, matching the hex value, e.g., \x0F.

Grouped expression—a regular expression in parentheses (matching a match for the regular expression)

Range—a sequence of characters enclosed in '[ ]'. A range normally matches any single character from the sequence. If the sequence begins with '^', it matches any single character not from the rest of the sequence. If two characters in the sequence are separated by '-', this is shorthand for the full list of ASCII characters between them (e.g. '[0-9]' matches any decimal digit). To include a literal ']' in the sequence, make it the first character (following a possible '^') or escape using a '\.' To include a literal '-,' make it the first or last character, or else escape using a '\.'

Any single character other than one of the above, matching that character. For example, the string "abcdef" consists of a sequence of five atoms.

A regular expression is enclosed in parentheses, and may be followed by one or more of the following modifiers:

('/i'), indicating case-insensitive match ('/x'), indicating match totally ignoring whitespace ('/N'), indicating match ignoring all NULL characters Matches anchored at line breaks may be supported, corresponding to using the modifier '/m'.

The following are some regex examples. The first recognizes HTTP based on a single response packet (first piece, considered as a contiguous string on a single line) or POST request packet (second piece). This does a case-insensitive match and matches whitespace runs using zero or more characters from the range '[\x09-\x0d-~]'. Note that the space in this range is a significant character and could have been represented by \x20.

---

(^http/(0\.9|1\.0|1\.1) [1-5][0-9][0-9] [\x09-\x0d -~]*(connection:|content-type:|content-length:|date:)|^post [\x09-\x0d -~]* http/[01]\.[019])/i

---

The following recognizes a particular kind of HTTP request using a case-insensitive match. Note that it is not anchored at the start of anything and can report a match that begins anywhere in the payload.

```
(http/(0\.9|1\.0|1\.1).*(user-agent: itunes))/i
```

A typical HTTP header can have multiple header fields separated by newlines. The following matches specific content in a user-agent header field in an HTTP request within a line terminated by an explicit newline, then matches the content-type response header. As such it depends upon cross-packet state to continue matching on the response packets.

```
((user-agent: quicktime \(qtver=[0-9].[0-9].[0-9];os=[\x09-\x0d -
~]+\)\x0d\x0a).*(content- type:[\x09-\x0d -~]+video/quicktime\x0d\x0a))/i
```

The following two signatures recognize a particular exchange for a DirectConnect peer-peer session. The first looks for a packet with "$Lock" anchored at the start of the packet and a "|" anchored at the end of the packet. This must be qualified as in the server-to-client (reverse) direction, and sets a cross signature flag. The second must also be anchored at the beginning and end of the packet, and must be qualified by the fact that a particular cross-signature flag is set, and that it is in the client-to-server (forward) direction. The match is only reported after the second match, which potentially might occur a few packets later in the flow. In general, qualifications can be used to advantage to avoid potential false positives.

```
^\x24Lock.*\x7c$
^\x24ValidateNick.*\x7c$
```

Many applications can be recognized based on a single packet, which is generally the first one exchanged on the connection. For those that require inspecting multiple packets, two modes are provided by the present invention. These two modes are referred to below as cross-packet state mode and cross-signature flags mode. These states are maintained on a per-flow basis. Each DFA can support optional configuration of at least one of these modes.

In general, these modes can be turned on and off for each regex engine. In order to allow a single pattern to match across arbitrary packet boundaries, the regex engines can save the current state context into the regex state table memory to be retrieved later when another packet arrives for the same flow. That way the pattern can continue to be matched regardless of how many other flows are analyzed between the two packets.

Cross-packet state mode is logically equivalent to reassembling the stream in a single buffer and then matching across that buffer. Here, a stream is considered the straightforward concatenation of the payloads in the order that they arrived regardless of direction, for example, HTTP Request then HTTP Response. However, rather than accumulating the stream in a buffer the DFA matches packets as they arrive, saving the match state at the end of a packet and using it as the start state for the next. To support cross-packet state mode, a DFA can maintain the next state pointers on a per-flow basis in a cross-packet state table that is the same size as the flow table.

In cross-signature flags mode, different signatures are used for each packet, but a match is only reported if a specific sequence of matches occurs. Cross-signature flags are used for linking matches, by having one successful match set a flag without being reported, and having the subsequent one be dependent on this flag being set in order to qualify the match. For this, a vector of flags can be associated with the flow state. In one embodiment, a minimum of 16 flags is supported for each DFA for which cross-signature flags mode is enabled. These can be available as a global pool of flags for qualifying matches from any DFA with cross-signature flags mode enabled.

With cross-signature flags mode, the first signature contains the expression to match the content of an initial packet and, as a match action, sets a cross-signature flag bit. A second signature would include a qualifier that it only be considered if a designated cross-signature flag bit has been set by a previous packet in the flow.

The match processor handles cross-signature flag updating as well as checking. Since these cross-signature flags are a property of a specific flow, the cross-signature flags are stored in configured regions of the state tables. While a packet is being processed, there are two copies maintained of the cross-signature flags. One is an updating copy where changes from the current packet are made. The other copy is for checking and reflects the state of the cross-signature flags at the end of the previous packet.

The following fields inside the match table (See FIG. 12) can be defined for cross-signature flag updating: Match_cross_sig_flag_index, specifying which cross-signature flag the action applies to; Match_cross_sig_flag_is_set, which when set, the cross-signature flag referenced by the index will get set by the match processor at the end of the current packet; and Match_cross_sig_flag_is_cleared, which when reset, the cross-signature flag referenced by the index will get reset by the match processor at the end of the current packet.

Signatures that update cross-signature flags, should first pass all of it's match qualifiers to be valid. However, the signatures that update cross-signature flags, need not be the highest priority or best match. If the match is valid, the cross-signature flags would be updated.

The following fields inside the match table can be defined for cross-signature flag checking: Check_cross_sig_flag_index, specifying which cross-signature flag the check applies to; Check_cross_sig_flag_is_set, which when set, the match is valid; and Check_cross_sig_flag_is_cleared, which when not set, the match is valid. The cross-signature flag being checked should have been set by a previous packet in the same flow.

For the first packet of a new flow, the match processor can initialize all cross-signature flags to '0'. As the regex engines detect matches that require cross-signature flag updating, the match processor modifies the updating copy of the cross-signature flags. Once the match processor reaches the EOP condition, it then transfers this updated copy of the cross-signature flags to be stored per flow.

For the subsequent packets, the state tables read the active cross-signature flag information for that specific flow. If any detected matches dictate cross-signature flag changes, then the updating copy is modified. Whenever a signature match requires cross-signature flag checking, the check copy of the cross-signature flags is used for that purpose (not the updated copy).

Cross-signature flags are stored in the flow table and state table memory. In one embodiment, it is configurable in blocks of 16 flags, up to 512 flags. The first 16 flags are stored in the flow table in a 16-bit Cross_sig_flags field per flow. If configured, the remaining 31 blocks of flags can be stored in the state table. The configuration for this per flow storage is in the regex engine as a special multi-packet mode. For 8 k flows, a block of flags would need 16 KB of state table memory to be allocated for storage. Any number can be enabled from 1-32 blocks. If all 512 flags were enabled, 512 KB or memory would be allocated.

Each engine can have a specific range of flags that it stores, if enabled. In one embodiment, regex engine 1 can manage storage for flags 16-32, all the way up to regex engine 31, which can manage the storage of flags 496-511. Regex engine 0 is not needed to store the first 16 flags, as they can be stored in the flow table. The regex engine that stores the flags can be completely independent of the regex engine(s) making updates to the flags. Also, the engines/flag blocks enabled need not be contiguous. Any block can be independently enabled or disabled in the corresponding regex engine. At the beginning of the packet, all engines storing flags can load the flags into a global flag buffer. Any signature can update any flag. At the end of the packet, the updates are written back into the state table.

In general, regex matching compares the packet payload against the signature database and reports all matches. Matching is state-machine based, and there are multiple state machines or DFAs. Each DFA is started in a specified state, and transitions for each byte of the packet until it either reaches a state in which there are no more transitions to take, or until it reaches the end of the payload.

Basically, a DFA is realized as a state table. Logically, each state in the DFA state table contains two parts, a 256 entry next-state jump table and match report values. Each entry in a next-state jump table constitutes a pointer to another DFA state. The match report value indicates whether the state is a match state (i.e., matches the regular expression) and what value to report.

The processing of an input string starts with the first byte and the start DFA state table. The byte is used to index into the next-state table to get a pointer to the next state. The lookup for the next byte is repeated in the string using the next DFA state until either a state is reached with no next state pointer for an input byte, or the end of the string is reached. A match would be reported if indicated by a state during the run.

For many regular expressions, the next-state table is relatively sparse (i.e., only a few exact match entries have an actual next state pointer) or has multiple entries pointing to the same next state (e.g., for a range of values).

A DFA may get to a state with no transitions, in which case, it is finished before the packet is done. A special IDLE state can be used to prevent further matching for this packet.

Each DFA can report one or more matches during processing for a packet. Each match can indicate the match_index into one of the signature match tables, and an indication of whether or not it matched on the last byte of the packet. FIG. 12 illustrates an example of the attributes in a signature match table entry. There can be one signature match table entry per signature.

In general, the signature match table can include three kinds of attributes: Match, which is used during the matching process; Check, which is used to qualify matches as part of determining the best match; and Report, which includes values to send to the flow tracker in the signature match response if best match.

In one embodiment, there is logically one 1024-entry signature match table, which is partitioned into four 256-entry sub-tables. Each group of eight DFA engines can be configured to share a signature match sub-table, and report an 8-bit match index into its table. Here, it should be noted that the shadow flow table can maintain a best match index for that flow as a 10-bit entity, where the two least-significant bits of the best match index can be used to select the signature match table.

DFAs can report multiple matches for any number of reasons. In particular, wildcards could cause a regular expression to match the input in multiple places. Also, different regular expressions can match because a protocol has "sub-protocols." For example, this could happen when different applications running over HTTP are to be distinguished, or when there are false positives (i.e., a signature that is too general and matches when it shouldn't).

Post match processing can qualify matches using criteria in the signature match table, resolve qualifying matches to find the best match so far for this flow or all those found, and send match report packets as required. Logically, post-match processing can be done for each packet after all DFAs are done matching the packet.

The best match for a packet is derived by comparing report parameters from the signature match table for a qualifying candidate match against those of the best match so far, if any. In one embodiment, the best match can be resolved as follows: if the match is final, and the best match so far is not, then take the new match; if both are final, then take the one with the higher priority; if both have the same priority, take the one with the lower numbered signature-id. Matches should be able to be resolved in arbitrary order with no dependencies.

After resolving qualifying matches, match report packets are sent as required. In one embodiment, if a best match was reported, then if Final, or if the last packet from signature matching, then report the best match. The flow entry is then invalidated to ignore subsequent packets that might arrive for signature matching before the flow tracker processes the signature matching response. If a best match was reported, the if not final, but indicates that a report should be sent anyway, then a signature matching response is created and send to the flow tracker.

If there isn't a match to report but it is the last packet, then the flow is invalidated and a signature match response is sent indicating no signature matched. Finally, if there isn't a match and this isn't the last packet, and there is cross packet state, then the cross packet state in the flow table is updated.

As has been described, once the SM engine is finished processing a flow, a response is sent back to the flow tracker so that the proper action can be applied to the rest of the packets of the flow. As noted above, this can be done by utilizing the packet interface from the AXP to the ingress pipeline. A packet is injected into the ingress pipeline so that the flow tracker session table can be updated. Having the results relayed through a packet provides for a generalized method of updating the session table, independent of whether the results are coming from the internal signature match engine, an external signature match engine, or a combination of both. This allows the table accesses to the session table to be scheduled with incoming packet traffic and CPU initiated updates. Arbitration for memory accesses to the session table is implicitly done when the results packet is scheduled in the ingress pipeline.

In one embodiment, the internal SM engine can be optimized to match for a set of the most common signatures. To expand flow identification capabilities, an external signature matching engine or CPU can be added to handle the more complex cases and provide a means of scaling the number of signatures.

An example format of the results packet is illustrated in FIGS. 13A-13C. As illustrated, the results packet of FIG. 13A includes the original unmodified packet that triggered the match, an 8-byte results header, and an L2 encapsulation header. The 8-byte results header is further detailed in FIG. 13B, while the results flags contained in the 8-byte results header is further detailed in FIG. 13C.

Signature results packets can be identified as they enter the ingress pipeline by matching the destination MAC address and type field with pre-configured values. When the flow tracker receives a results packet from the SM engine, it uses the flow index in the header to retrieve the session table entry. The timestamp in the header is then validated against the value in the session entry to ensure that the results are indeed for this flow. For flow-tracking purposes the flow index and timestamp can be used to uniquely identify the flow. If there is a mismatch or if the flow entry is not in the correct state, then the entry will not be updated. This can happen if the SM engine is providing results for a flow that has already ended or because of some other error condition that causes the flow tracker and SM engine to get out of sync.

As the SM engine receives packets in a flow for processing, it actively searches for matches on the byte stream. Depending on how the match rules are configured, there can be cases where it is desired that the SM engine continue searching the byte stream even after an intermediate match result is found. This can facilitate finding a better match as more packets arrive and more data is available. To accommodate this, the flow tracker can be setup to accept intermediate results from the SM engine. This can be indicated in the results header by having the Final bit cleared. An intermediate result is stored in the session entry but does not immediately cause the flow tracker to utilize the results. It is only utilized and acted on, if a Final results match is never received after a configured timeout period.

The fields in the results header are further described in FIG. 14. It indicates whether a match was found, how the flow should be processed, and provides information on which signature was matched. If there is a match, the flow state for that entry is updated. The policy index, signature id, and age index are stored for later use. Analysis of subsequent packets in the flow will see that the flow has been signature matched and that actions specified by the policy index are to be applied on the packet. The flow entry remains in this state until the flow terminates or is inactive for a specified amount of time.

As previously noted, the Final bit indicates whether the result is an intermediate result or whether it should be acted upon immediately. The Keep_flow bit indicates whether the flow should be kept in the session table and tracked, or whether it is of no interest and should be released for re-use by another flow. The Apply_action bit indicates whether the tracked flow should have actions applied to subsequent packets in the flow or whether it should be treated as a count-only flow. If actions are enabled for the flow, the policy index specified in the header is used to retrieve the set of actions to apply to the packets. The SM_error flag indicates that an error was encountered during processing of the flow. This will be logged in the session table for the flow, but no specific action would be taken on the flow if this bit is set. The Http_persistent flag indicates special handling is required for this flow. The flow would proceed to the active state, and wait for the detection of a new connection, before sending new packets to be matched. The Age index provides a signature-specific inactivity timeout value that can be used to specify when active flows should be removed from the session table. The Copy_to_cpu field specifies whether the packet should be copied to the CPU.

During normal processing, session table entry updates are handled exclusively by the hardware, as all the information needed to update the status of the flow can be retrieved independent of CPU intervention. These updates to the session table entries include signature match results that are sent via packets and don't require any explicit CPU control. In some scenarios, it may be necessary for the CPU to update the session table with information not directly accessible by the hardware. This can be supported via table op commands (e.g., tbl_insert, tbl_lookup, and tbl_delete) issued to the session table.

Once a flow has been signature matched, it is desirable to apply policy actions to subsequent packets in the flow. The flow tracker provides a means of storing the results from the SM engine, identifying subsequent packets in the flow, and applying the specified actions on those packets. Some of the actions that can be supported include dropping, metering, changing priority or class of service (COS), mirroring, copying packets to CPU, etc.

Figure 15:
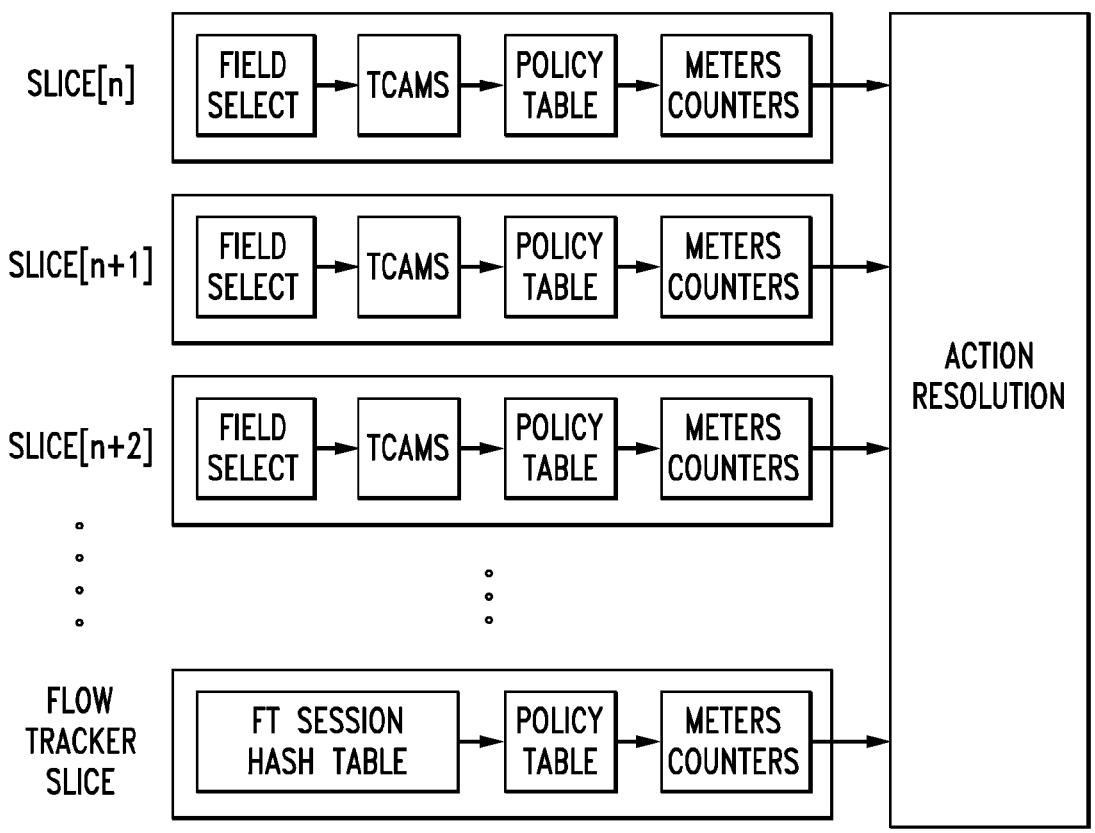
FIG. 15 illustrates an example embodiment of retrieving policy actions for a packet.

The flow tracker can leverage the existing policy actions and resolution logic defined in the IFP. This provides a robust set of actions that can be applied to any of the flows that are being flow tracked. The session table can be integrated into the IFP module, so that it appear like another slice. As illustrated in FIG. 15, the flow tracker session table lookup can be coincident with the field processor ternary content addressable memory (TCAM) lookups in the other slices, and can produce an index that is used to retrieve the policy actions for the packet.

In one embodiment, there are a total of 256 entries in the policy table. Here, it is assumed that each signature supported would require one policy table entry. This table is sized for the approximate number of different signatures likely to be seen. Although it may be possible to supply different policy actions for each direction of the flow, in practical use, it is acceptable to apply the same policy action to both directions of the flow.

Flow metering can be done using the existing resources available in the IFP. In one embodiment, separate rate meters for each of the flows being tracked is supported. The number of policy indexes supported can limit the number of meters that can be selected. In one embodiment, all the flows with a particular signature match index are throttled using a common shared meter. There can also be included an additional mode in the IFP that can remap the selected meters so that they can be tracked on a per-port basis. This would allow flows to be metered on a per-signature/per-port basis.

As part of the flow-tracking functions, the hardware monitors each of the individual flows and determines when a flow should be terminated and removed from the session table. Flow entries can be expired for a number of reasons including inactivity (e.g., packets not seen for a sufficiently long time), explicit indicators (e.g., TCP flows have packets that explicitly indicate that the flow is finished), processing errors (e.g., during the matching process, errors were detected or timeouts were encountered), CPU terminated, etc.

These checks can be performed by the flow tracker whenever there is an event that updates the flow's session table entry. This could be the result of a regular packet in the flow accessing the table, the results packet from the SM engine updating the entry, a CPU table operation command, or by the background age scanning process. In each of these cases, the checks that are performed depend on the state of the flow entry.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A switch for performing packet inspection, comprising:
  a flow tracker that reviews packets that enter the switch at an ingress pipeline, said flow tracker creating an entry in a flow tracker session table on identification of a new flow of packets to be tracked, said flow tracker reviewing a packet associated with a previously identified flow and generating flow information to be forwarded with said reviewed packet to a memory management unit in said switch, said flow information including a flow index that identifies a particular flow of packets to which said reviewed packet is associated; and
  a signature matching engine in an auxiliary pipeline of the switch that receives said reviewed packet and said flow information from said memory management unit in the switch, said signature matching engine examining said reviewed packet using context state information that is retrieved from a state table in memory of said signature matching engine using said flow index, wherein said retrieved context state information identifies a state of examination of an expression matching state machine in examining a prior packet in a flow identified by said flow index, wherein results from said expression matching state machine are included by said signature matching engine in a response packet that is sent by said signature matching engine to said ingress pipeline of the switch.

2. The switch of claim 1, wherein a flow of packets is identified based on a source address, destination address, source port, destination port, and protocol.

3. The switch of claim 1, wherein said expression matching state machine is a deterministic finite state automata state machine.

4. The switch of claim 1, wherein said auxiliary pipeline is separate from an egress pipeline in the switch.

5. A switch for performing packet inspection, comprising:
  a flow tracker that reviews packets that enter the switch at an ingress pipeline, said flow tracker creating an entry in a flow tracker session table on identification of a new flow of packets to be tracked, said flow tracker reviewing a packet associated with a previously identified flow and generating flow information to be forwarded with said reviewed packet to a memory management unit in said switch, said flow information including a flow index that identifies a particular flow of packets to which said reviewed packet is associated; and
  a signature matching engine in an auxiliary pipeline of the switch that receives said reviewed packet and said flow information from said memory management unit in the switch, said signature matching engine analyzing said reviewed packet using a plurality of cross signature flags that are retrieved from a state table in memory of said signature matching engine using said flow index, wherein each of said retrieved plurality of cross signature flags identifies a match result of one of a plurality of corresponding expression matching state machines in examining a prior packet in a flow identified by said flow index.

6. The switch of claim 5, wherein a flow of packets is identified based on a source address, destination address, source port, destination port, and protocol.

7. The switch of claim 5, wherein said expression matching state machine is a deterministic finite state automata state machine.

8. The switch of claim 5, wherein said auxiliary pipeline is separate from an egress pipeline in the switch.

9. The switch of claim 5, wherein results from said expression matching state machine are included by said signature matching engine in a response packet that is sent by said signature matching engine to said ingress pipeline of the switch.

10. A switch for performing packet inspection, comprising:
  a flow tracker that reviews packets that enter the switch at an ingress pipeline, said flow tracker creating an entry in a flow tracker session table on identification of a new flow of packets to be tracked, said flow tracker reviewing a packet associated with a previously identified flow and generating flow information to be forwarded with said reviewed packet to a memory management unit in said switch, said flow information including a flow index that identifies a particular flow of packets to which said reviewed packet is associated; and
  a signature matching engine in an auxiliary pipeline of the switch that receives said reviewed packet and said flow information from said memory management unit in the switch, said signature matching engine determining a match to a known signature based on an analysis of a combination of packets that includes said reviewed packet and one or more prior packets that are part of a flow identified by said flow index, wherein said analysis of said combination of packets is facilitated by context state information that is retrieved from a state table in memory of said signature matching engine using said flow index, wherein results from said expression matching state machine are included by said signature matching engine in a response packet that is sent by said signature matching engine to said ingress pipeline of the switch.

11. The switch of claim 10, wherein a flow of packets is identified based on a source address, destination address, source port, destination port, and protocol.

12. The switch of claim 10, wherein said expression matching state machine is a deterministic finite state automata state machine.

13. The switch of claim 10, wherein said auxiliary pipeline is separate from an egress pipeline in the switch.

* * * * *